(12) United States Patent
den Boer et al.

(10) Patent No.: US 10,930,234 B1
(45) Date of Patent: Feb. 23, 2021

(54) GRAY SCALE LIQUID CRYSTAL DISPLAY PANEL WITH MULTIPLEXED ANALOG GRAY LEVELS

(71) Applicant: a.u. Vista, Inc., Irvine, CA (US)

(72) Inventors: Willem den Boer, Irvine, CA (US); Seok-Lyul Lee, Hsinchu (TW)

(73) Assignee: A.U. VISTA, INC., Irvine, CA (US)

( * ) Notice: Subject to any disclaimer, the term of this patent is extended or adjusted under 35 U.S.C. 154(b) by 0 days.

(21) Appl. No.: 16/804,115

(22) Filed: Feb. 28, 2020

(51) Int. Cl.
*G09G 3/36* (2006.01)
*G02F 1/1362* (2006.01)

(52) U.S. Cl.
CPC ....... *G09G 3/3607* (2013.01); *G02F 1/13624* (2013.01); *G02F 1/136213* (2013.01); *G02F 1/136286* (2013.01); *G09G 3/3648* (2013.01); *G09G 2300/0842* (2013.01)

(58) Field of Classification Search
CPC .............. G09G 3/3607; G09G 3/3648; G09G 2300/0842; G02F 1/136213; G02F 1/13624; G02F 1/136286
See application file for complete search history.

(56) References Cited

U.S. PATENT DOCUMENTS

| | | | |
|---|---|---|---|
| 8,330,890 B2 | 12/2012 | Miyachi et al. | |
| 10,121,424 B2 | 11/2018 | Chung et al. | |
| 2008/0238842 A1* | 10/2008 | Yatabe | G09G 3/3688 345/87 |
| 2012/0019754 A1* | 1/2012 | Ting | G09G 3/3648 349/123 |

* cited by examiner

*Primary Examiner* — Towfiq Elahi
(74) *Attorney, Agent, or Firm* — Tim Tingkang Xia, Esq.; Locke Lord LLP

(57) ABSTRACT

A liquid crystal display (LCD) panel includes two substrates and one or more pixel arrays disposed therebetween. The one or more pixel arrays define a pixel matrix having a plurality of pixels. For each of the pixels, the one or more pixel arrays form a mirrored pixel circuit structure including a first pixel electrode and a second pixel electrode opposite to each other. The first pixel electrode and the second pixel electrode in each of the pixels are independently controlled. A quantity of gray levels displayed by each of the pixels of the LCD panel is M, the first pixel electrode and the second pixel electrode in each of the pixels are provided with a voltage switchable between N analog levels, M and N are integers, and $N=2\times\sqrt{M}$.

20 Claims, 15 Drawing Sheets

| Vdata1 | Vdata2 | VLCodd (= Vdata1 − Vdata2) | VLCeven (= Vdata2 − Vdata1) | Gray level |
|---|---|---|---|---|
| 0 (equal to Vdata 2) | 0 | 0 | 0 | GL0 |
| Vth | 0 | Vth | −Vth | GL1 |
| Vth | −DV2 | Vth + DV2 | −(Vth + DV2) | GL2 |
| Vth | −2*DV2 | Vth + 2*DV2 | −(Vth + 2*DV2) | GL3 |
| Vth | −3*DV2 | Vth + 3*DV2 | −(Vth + 3*DV2) | GL4 |
| Vth + DV1 | −3*DV2 | Vth + DV1 + 3*DV2 | −(Vth + DV1 + 3*DV2) | GL5 |
| Vth + DV1 | −2*DV2 | Vth + DV1 + 2*DV2 | −(Vth + DV1 + 2*DV2) | GL6 |
| Vth + DV1 | −DV2 | Vth + DV1 + DV2 | −(Vth + DV1 + DV2) | GL7 |
| Vth + DV1 | 0 | Vth + DV1 | −(Vth + DV1) | GL8 |
| Vth + 2*DV1 | 0 | Vth + 2*DV1 | −(Vth + 2*DV1) | GL9 |
| Vth + 2*DV1 | −DV2 | Vth + 2*DV1 + DV2 | −(Vth + 2*DV1 + DV2) | GL10 |
| Vth + 2*DV1 | −2*DV2 | Vth + 2*DV1 + 2*DV2 | −(Vth + 2*DV1 + 2*DV2) | GL11 |
| Vth + 2*DV1 | −3*DV2 | Vth + 2*DV1 + 3*DV2 | −(Vth + 2*DV1 + 3*DV2) | GL12 |
| Vth + 3*DV1 | −3*DV2 | Vth + 3*DV1 + 3*DV2 | −(Vth + 3*DV1 + 3*DV2) | GL13 |
| Vth + 3*DV1 | −2*DV2 | Vth + 3*DV1 + 2*DV2 | −(Vth + 3*DV1 + 2*DV2) | GL14 |
| Vth + 3*DV1 | −DV2 | Vth + 3*DV1 + DV2 | −(Vth + 3*DV1 + DV2) | GL15 |
| Vth + 3*DV1 | 0 | Vth + 3*DV1 | −(Vth + 3*DV1) | GL16 |

FIG. 5B

| Gray scale | Quantity M of analog input levels required in conventional LCD panel | Quantity N of analog input levels required for LCD panel of the present disclosure |
|---|---|---|
| 3 bit | 8 | 2×3 (=6) |
| 4 bit | 16 | 2×4 (=8) |
| 5 bit | 32 | 2×5 (=10) |
| 6 bit | 64 | 2×6 (=12) |
| 7 bit | 128 | 2×7 (=14) |
| 8 bit | 256 | 2×8 (=16) |

FIG. 5C

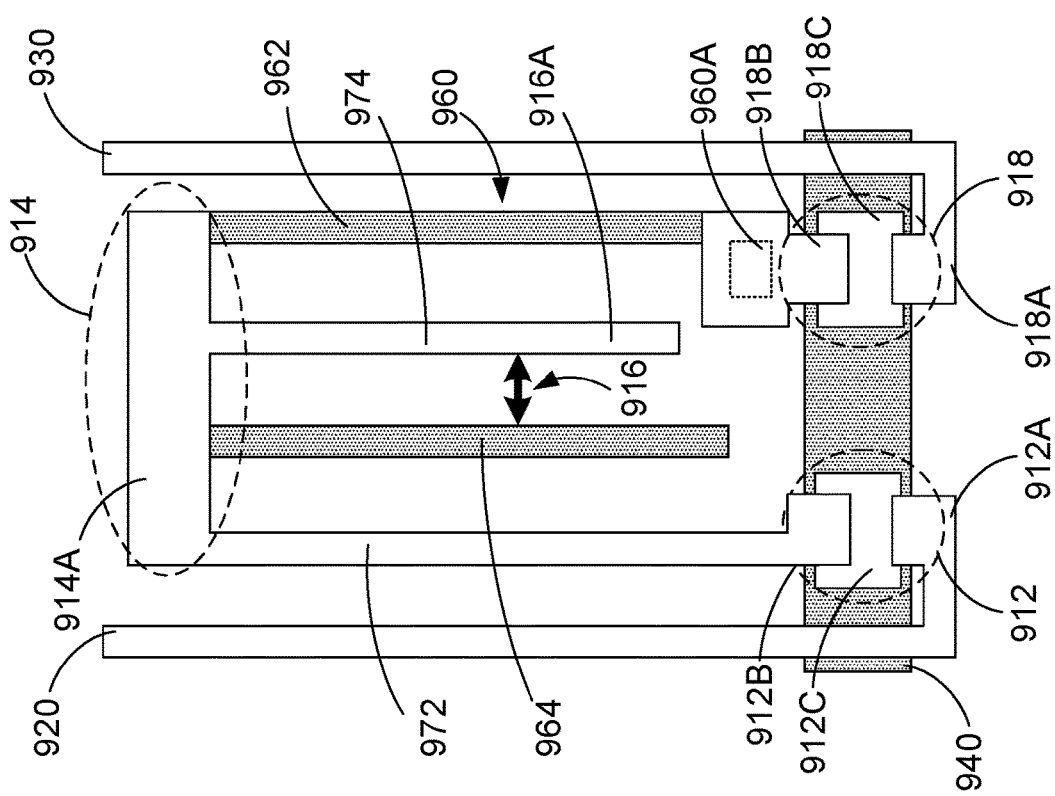

GRAY SCALE LIQUID CRYSTAL DISPLAY PANEL WITH MULTIPLEXED ANALOG GRAY LEVELS

FIELD

The disclosure relates generally to display technology, and more particularly to a gray scale liquid crystal display (LCD) panel with multiplexed analog gray levels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, small-sized displays, such as liquid crystal displays (LCDs) used in Internet of things (IoT) devices or other small devices, require a simple interface to the external electronics to reduce cost and power. These small-sized displays also benefit from a single flex to the external driver chip, which makes it easier to enable flexibility of the displays in both directions. One way to achieve this is integrating parts of the drive circuitry on the substrate of the LCD and use a single external driver chip which combines the functions of timing controller and supplying data levels. It is relatively easy to integrate the gate drivers on the glass since their frequency of operation is relatively low and they have to supply just one of two voltage levels to the gate lines to turn the thin-film transistors (TFTs) either ON or OFF. Conventional data driver circuits are much more complicated and require buffers and digital-to-analog converters (DACs). Buffers and DACs cannot be easily implemented in TFTs, because the field-effect mobility of TFTs is too low, the operating speed is too slow, and the size cannot be reduced enough on the display substrate to reduce power and border size.

To solve this problem, there are existing driving methods using multiplexers on the glass or flexible substrate, which switch analog levels from the external driver chip. However, in the existing driving methods, only a limited number of gray levels can be implemented, which gives poor gray level scale performance that is insufficient for realistic images or videos.

Therefore, a heretofore unaddressed need exists in the art to address the aforementioned deficiencies and inadequacies.

SUMMARY

One aspect of the disclosure relates to a liquid crystal display (LCD) panel, which includes: a first substrate and a second substrate spaced apart from each other; a pixel array, disposed on the first substrate and defining a pixel matrix having a plurality of pixels, wherein for each of the pixels, the pixel array has a mirrored pixel circuit structure comprising a first pixel electrode and a second pixel electrode opposite to each other, and the first pixel electrode and the second pixel electrode in each of the pixels are independently controlled; and a liquid crystal layer disposed between the pixel array and the second substrate; wherein a quantity of gray levels displayed by each of the pixels of the LCD panel is M, the first pixel electrode and the second pixel electrode in each of the pixels are provided with a voltage switchable between N analog levels, M and N are integers, and $N=2\sqrt{M}$.

In certain embodiments, the LCD panel is an in-plane switching (IPS) LCD panel or a fringe field switching (FFS) LCD panel.

In certain embodiments, the pixel array includes: a plurality of first data lines extending along a first direction, configured to provide a plurality of first pixel voltage signals to the pixels; a plurality of second data lines extending along the first direction, configured to provide a plurality of second pixel voltage signals to the pixels; a plurality of common lines extending along a second direction, configured to provide a common voltage signal to the pixels; a plurality of scan lines extending along the second direction, configured to provide a plurality of scan voltage signals to the pixels; and a plurality of pixel circuits corresponding to the pixels, wherein each of the pixel circuits includes: the first pixel electrode and the second pixel electrode opposite to each other; a first transistor having a first gate, a first source and a first drain, wherein the first source is electrically connected to one of the first data lines to receive one of the first pixel voltage signals, the first drain is electrically connected to the first pixel electrode, and the first gate is electrically connected to one of the scan lines to receive one of the scan voltage signals; a second transistor having a second gate, a second source and a second drain, wherein the second source is electrically connected to one of the second data lines to receive one of the second pixel voltage signals, the second drain is electrically connected to the second pixel electrode, and the second gate is electrically connected to the one of the scan lines to receive the one of the scan voltage signals; a first storage capacitor having a first end and a second end, wherein the first end is electrically connected to the first drain of the first transistor, and the second end is electrically connected to one of the common lines to receive the common voltage signal; and a second storage capacitor having a third end and a fourth end, wherein the third end is electrically connected to the second drain of the second transistor, and the fourth end is electrically connected to the one of the common lines to receive the common voltage signal.

In certain embodiments, the pixel array includes: a plurality of first data lines extending along a first direction, configured to provide a plurality of first pixel voltage signals to the pixels; a plurality of second data lines extending along the first direction, configured to provide a plurality of second pixel voltage signals to the pixels; a plurality of scan lines extending along a second direction, configured to provide a plurality of scan voltage signals to the pixels; and a plurality of pixel circuits corresponding to the pixels, wherein each of the pixel circuits includes: the first pixel electrode and the second pixel electrode opposite to each other; a first transistor having a first gate, a first source and a first drain, wherein the first source is electrically connected to one of the first data lines to receive one of the first pixel voltage signals, the first drain is electrically connected to the first pixel electrode, and the first gate is electrically connected to one of the scan lines to receive one of the scan voltage signals; a second transistor having a second gate, a second source and a second drain, wherein the second source is electrically connected to one of the second data lines to receive one of the second pixel voltage signals, the second drain is electrically connected to the second pixel electrode, and the second gate is electrically connected to the one of the scan lines to receive the one of the scan voltage signals; and a storage capacitor having a first end and a second end, wherein the first end is electrically connected to the first drain of the first transistor, and the second end is electrically connected to the second drain of the second transistor.

In certain embodiments, the LCD panel further includes a color filter layer, disposed on one of the first substrate and second substrate.

In certain embodiments, $M=2^{2X}$, X is an integer, and $N=2^{X+1}$.

In certain embodiments, M=16, and N=8.

In certain embodiments, for each of the pixels, the first pixel electrode is provided with a first pixel voltage signal switchable between 0, Vth, Vth+ΔV1, Vth+2*ΔV1, and Vth+3*ΔV1, wherein Vth is a threshold voltage, and ΔV1 is a first voltage difference; and the second pixel electrode is provided with a second pixel voltage signal switchable between 0, −ΔV2, −2*ΔV2, and −3*ΔV2, wherein ΔV2 is a second voltage difference different from ΔV1.

In certain embodiments, ΔV2=ΔV1/4.

Another aspect of the disclosure relates to a LCD panel, which includes: a first substrate and a second substrate spaced apart from each other; a first pixel array, disposed on the first substrate; a second pixel array, being a mirrored structure of the first pixel array and disposed on the second substrate, wherein the first pixel array and the second pixel array correspondingly define a pixel matrix having a plurality of pixels, and for each of the pixels, the first pixel array comprises a first pixel electrode, and the second pixel array comprises a second pixel electrode opposite to the first pixel electrode; and a liquid crystal layer disposed between the first pixel array and the second pixel array; wherein a quantity of gray levels displayed by each of the pixels of the LCD panel is M, the first pixel electrode and the second pixel electrode in each of the pixels are provided with a voltage switchable between N analog levels, M and N are integers, and $N=2\times\sqrt{M}$.

In certain embodiments, the LCD panel is a twisted nematic (TN) LCD panel or a vertical alignment (VA) LCD panel.

In certain embodiments, the first pixel array includes: a plurality of first data lines extending along a first direction, configured to provide a plurality of first pixel voltage signals to the pixels; a plurality of first common lines extending along a second direction, configured to provide a first common voltage signal to the pixels; a plurality of first scan lines extending along the second direction, configured to provide a plurality of first scan voltage signals to the pixels; and a plurality of first pixel circuits corresponding to the pixels, wherein each of the first pixel circuits includes: the first pixel electrode; a first transistor having a first gate, a first source and a first drain, wherein the first source is electrically connected to one of the first data lines to receive one of the first pixel voltage signals, the first drain is electrically connected to the first pixel electrode, and the first gate is electrically connected to one of the first scan lines to receive one of the first scan voltage signals; and a first storage capacitor having a first end and a second end, wherein the first end is electrically connected to the first drain of the first transistor, and the second end is electrically connected to one of the first common lines to receive the first common voltage signal.

In certain embodiments, the second pixel array includes: a plurality of second data lines extending along the first direction, configured to provide a plurality of second pixel voltage signals to the pixels; a plurality of second common lines extending along the second direction, configured to provide a second common voltage signal to the pixels; a plurality of second scan lines extending along the second direction, configured to provide a plurality of second scan voltage signals to the pixels; and a plurality of first pixel circuits corresponding to the pixels, wherein each of the first pixel circuits includes: the second pixel electrode; a second transistor having a second gate, a second source and a second drain, wherein the second source is electrically connected to one of the second data lines to receive one of the second pixel voltage signals, the second drain is electrically connected to the second pixel electrode, and the second gate is electrically connected to one of second first scan lines to receive one of the first scan voltage signals; and a second storage capacitor having a third end and a fourth end, wherein the third end is electrically connected to the second drain of the second transistor, and the fourth end is electrically connected to one of the second common lines to receive the second common voltage signal.

In certain embodiments, the LCD panel further includes a color filter layer, disposed on one of the first substrate and second substrate.

In certain embodiments, $M=2^{2X}$, X is an integer, and $N=2^{X+1}$.

In certain embodiments, M=16, and N=8.

In certain embodiments, for each of the pixels, the first pixel electrode is provided with a first pixel voltage signal switchable between 0, Vth, Vth+ΔV1, Vth+2*ΔV1, and Vth+3*ΔV1, wherein Vth is a threshold voltage, and ΔV1 is a first voltage difference; and the second pixel electrode is provided with a second pixel voltage signal switchable between 0, −ΔV2, −2*ΔV2, and −3*ΔV2, wherein ΔV2 is a second voltage difference different from ΔV1.

In certain embodiments, ΔV2=ΔV1/4.

In yet another aspect, the disclosure relates to a display device, which includes the LCD panel as described above.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 5B shows a table of gray levels for all combinations of the LC pixel voltages based on the curve as shown in FIG. 5A.

FIG. 5C shows a table of the quantity of gray levels displayed by each of the pixels of the LCD panel gray scales related to the quantity of analog level in which the voltage is switchable according to certain embodiments of the present disclosure.

FIG. 9 shows a top schematic view of a pixel layout in the pixel circuit structure of an IPS liquid crystal display panel as shown in FIGS. 8A and 8B according to certain embodiments of the present disclosure.

DETAILED DESCRIPTION OF THE DISCLOSURE

Figure 1A:
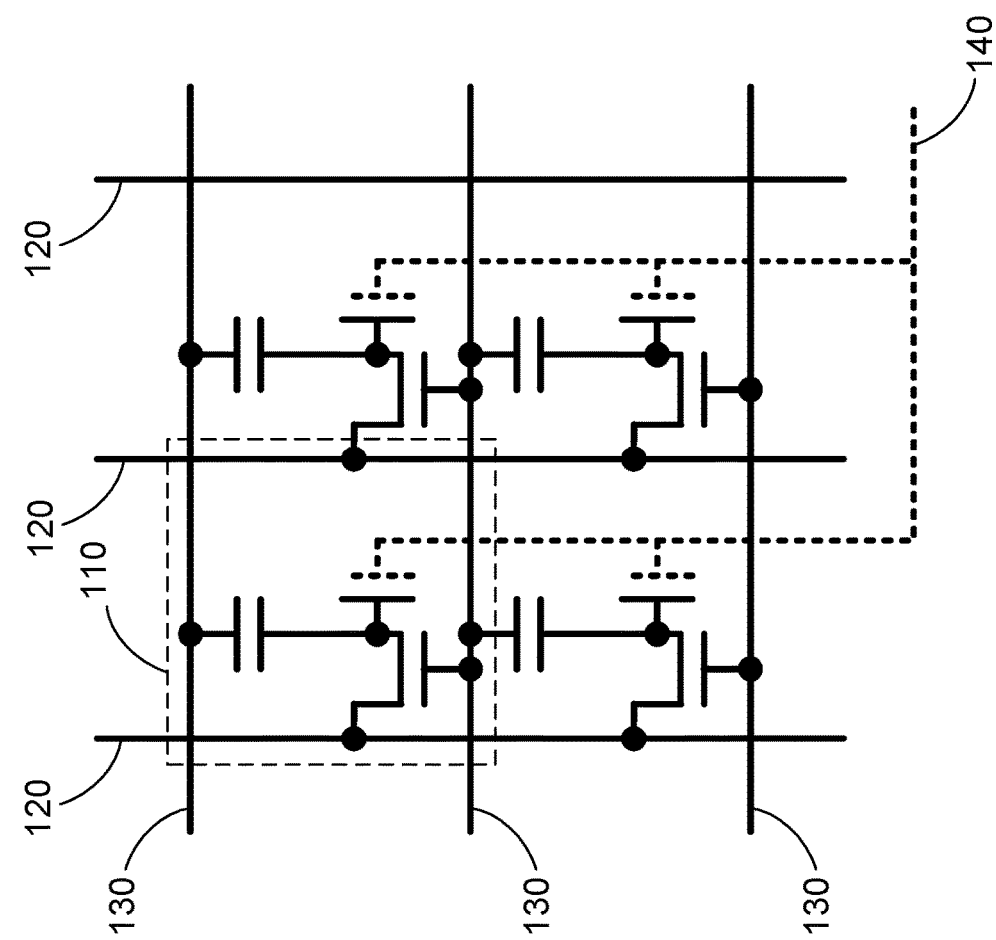
FIG. 1A shows a top schematic view of a pixel circuit structure of a liquid crystal display panel according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a display panel and a display device using the same.

As discussed above, in the LCDs, there are existing driving methods using multiplexers on the glass or flexible substrate, which switch analog levels from the external driver chip. For example, in one existing driving method, up to 8 gray levels (3-bit gray scale) are directly supplied from the silicon chip and supplied to the data lines of the display by a combination of multiplexers and shift registers. In this case, both multiplexers and shift registers can easily be implemented in TFTs, such as oxide TFTs or low-temperature polycrystalline silicon (LTPS) TFTs which have better performance than amorphous silicon (a-Si) TFTs. However, in the existing driving method, the quantity of gray levels to be implemented is limited by the quantity of interconnects to the external driver chip. For example, if the LCD has a 5-bit or higher gray scale, the very large number of interconnects to the external driver chip is required for the 5 bit or higher gray scale for the multiplexer controls, analog gray levels and shift register controls. Thus, only a limited number of gray levels can be implemented, which gives poor gray level scale performance that is insufficient for realistic images or videos.

To remedy this deficiency, one aspect of the disclosure relates to a LCD panel, which may be used to obtain a relatively high gray scale, such as a 6-bit or 8-bit gray scale with 64 or 256 gray levels, without a large increase in the quantity of externally connected analog gray levels.

Figure 1B:
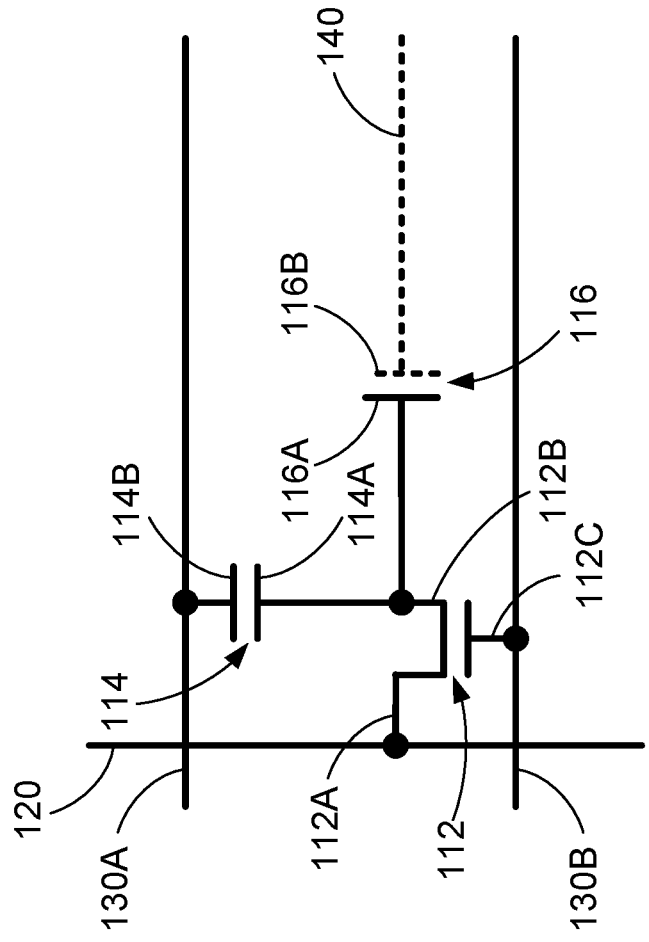
FIG. 1B shows an enlarged view of the pixel circuit structure of one pixel as shown in FIG. 1A.

FIG. 1A shows a top schematic view of a pixel circuit structure of a liquid crystal display panel, and FIG. 1B shows an enlarged view of the pixel circuit structure of one pixel as shown in FIG. 1A. Specifically, the pixel circuit structure 100 as shown in FIGS. 1A and 1B is applicable to a liquid crystal display panel in the twisted nematic (TN) mode or the vertical alignment (VA) mode. Further, although not explicitly shown in the pixel circuit structure 100, the liquid crystal display panel may include two substrates which are spaced apart from each other, and a liquid crystal layer may be disposed between the two substrates. In this case, components of the pixel circuit structure 100 may be respectively formed on the two substrates. For distinguishing purposes, the components of the pixel circuit structure 100 being formed on one of the two substrates are illustrated in solid lines, and the components of the pixel circuit structure 100 being formed on the other of the two substrates are illustrated in dotted lines.

As shown in FIG. 1A, the pixel circuit structure 100 includes a pixel array defining a pixel matrix having a plurality of pixels 110. In addition, the pixel circuit structure 100 further includes a plurality of data lines 120 extending along a vertical direction for providing pixel voltage signals to the pixels 110, a plurality of scan lines 130 extending along a horizontal direction for providing scan voltage signals to the pixels 110, and a common electrode 140 for providing a common voltage signal to the pixels 110. As shown in FIG. 1B, for each of the pixels 110, the pixel circuit of the pixel 110 includes a transistor 112, a storage capacitor 114, and a liquid crystal (LC) capacitor 116, and corresponds to one data line 120 and two adjacent scan lines 130A and 130B. The transistor 112 has a source 112A electrically connected to the corresponding data line 120 to receive a corresponding pixel voltage signal from the corresponding data line 120, a drain 112B, and a gate 112C electrically connected to the scan line 130B to receive a corresponding scan voltage signal from the scan line 130B. The storage capacitor 114 has a first end 114A electrically connected to the drain 112B of the transistor 112, and a second end 114B electrically connected to the scan line 130A. The LC capacitor 116 has a first end 116A electrically connected to the drain 112B of the transistor 112, and a second end 116B electrically connected to the common electrode 140 to receive the common voltage signal from the common electrode 140. Thus, when the scan line 130B provides a corresponding scan voltage signal to the gate 112C to turn on the transistor 112, the transistor 112 may transmit the pixel voltage signal from the data line 120 to the first end 116A of the LC capacitor 116.

In the actual manufacturing process of the liquid crystal display panel having the pixel circuit structure 100, the first end 116A of the LC capacitor 116 may be formed as a pixel electrode disposed on one substrate of the liquid crystal display panel, and the second end 116B of the LC capacitor 116 may be formed as the common electrode 140 disposed on the other opposite substrate of the liquid crystal display panel. Further, as shown in FIG. 1A, the second ends 116B of the LC capacitors 116 of all of the pixels 110 are all electrically connected to the common electrode 140. In this case, the common voltage signal provided by the common electrode 140 is the same for all of the pixels 110. Therefore, to achieve an 8-bit gray scale (i.e., $2^8$=256 gray levels) for each of the pixels 110, the pixel electrode (i.e., the first end 116A) must be supplied with 256 different voltage levels. In other words, if the pixel electrode (i.e., the first end 116A) can only be supplied with fewer quantities of different voltage levels, the liquid crystal display panel is limited to a relatively low quantity of gray levels.

In order to reduce the quantity of the voltage levels being supplied to the pixel electrode, one aspect of the disclosure relates to a LCD panel, in which the common electrode 140 as shown in FIG. 1 is replaced by a separate array of individual pixel electrodes controlled independently, thus forming a mirrored pixel circuit structure.

Figure 2A:
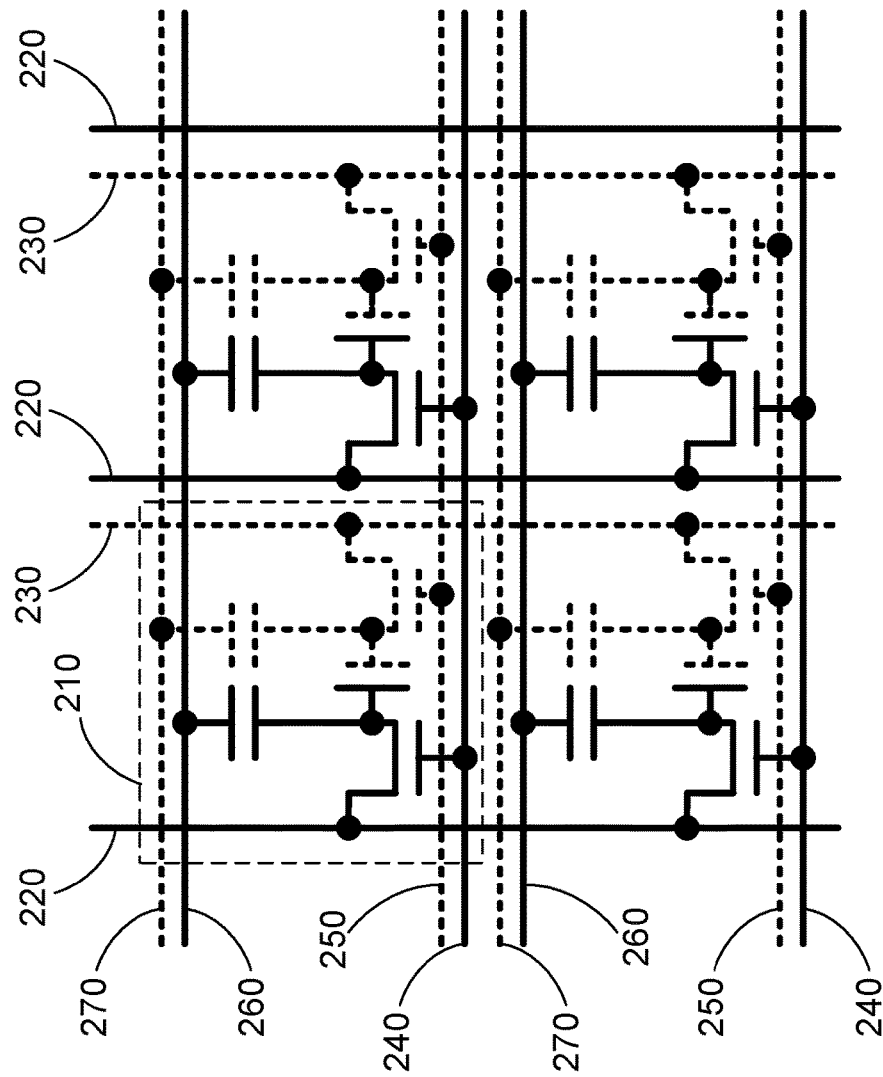
FIG. 2A shows a top schematic view of a pixel circuit structure of a liquid crystal display panel according to certain embodiments of the present disclosure.
Figure 2B:
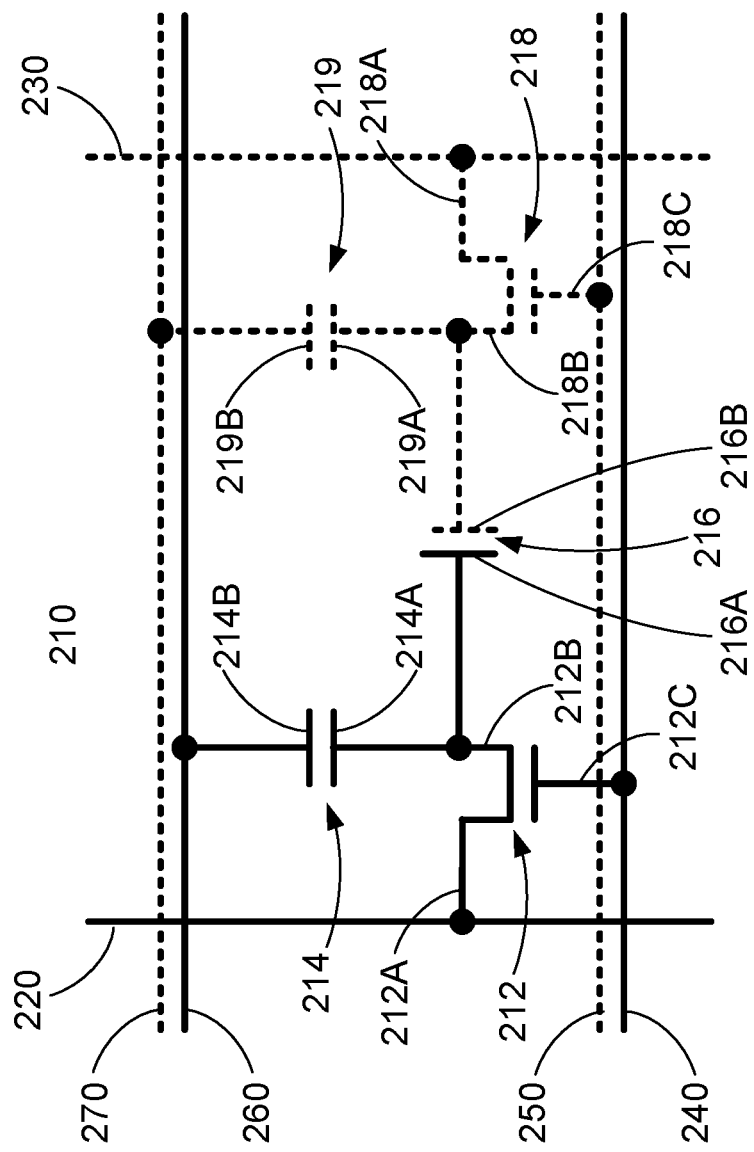
FIG. 2B shows an enlarged view of the pixel circuit structure of one pixel as shown in FIG. 2A.

FIG. 2A shows a top schematic view of a pixel circuit structure of a liquid crystal display panel according to certain embodiments of the present disclosure, and FIG. 2B shows an enlarged view of the pixel circuit structure of one pixel as shown in FIG. 2A. Specifically, the pixel circuit structure 200 as shown in FIGS. 2A and 2B is also applicable to a liquid crystal display panel in the TN mode or the VA mode. Further, although not explicitly shown in the pixel circuit structure 200, the liquid crystal display panel may include two substrates which are spaced apart from each other, and a liquid crystal layer may be disposed between the two substrates. In this case, components of the pixel circuit structure 200 may be respectively formed on the two substrates. For distinguishing purposes, the components of the pixel circuit structure 200 being formed on one of the two substrates are illustrated in solid lines, and the components of the pixel circuit structure 200 being formed on the other of the two substrates are illustrated in dotted lines.

As shown in FIG. 2A, the pixel circuit structure 200 includes a pixel array defining a pixel matrix having a plurality of pixels 210. In addition, the pixel circuit structure 200 further includes a plurality of first data lines 220 and a plurality of second data lines 230 extending along the vertical direction, a plurality of first scan lines 240 and a plurality of second scan lines 250 extending along the horizontal direction, and a plurality of first common lines 260 and a plurality of second common lines 270 extending along the horizontal direction. The first data lines 220 are used to provide first pixel voltage signals to the pixels 210, and the second data lines 230 are used to provide second pixel voltage signals to the pixels 210. The first scan lines 240 are used to provide first scan voltage signals to the pixels 210, and the second scan lines 250 are used to provide second scan voltage signals to the pixels 210. The first common lines 260 are used to provide a first common voltage signal to the pixels 210, and the second common lines 270 are used to provide a second common voltage signal to the pixels 210. In certain embodiments, for each of the pixels 210, the first scan voltage signal and the second scan voltage signal being provided to the same pixel 210 can be identical, and for all of the pixels 210, the first common voltage signal and the second common voltage signal can be identical.

As shown in FIG. 2B, for each of the pixels 210, the pixel circuit of the pixel 210 has a substantially mirrored structure, including a first transistor 212, a first storage capacitor 214, a LC capacitor 216, a second transistor 218 and a second storage capacitor 219. The first transistor 212 and the second transistor 218 are substantially mirrored to each other, the first storage capacitor 214 and the second storage capacitor 219 are substantially mirrored to each other, and the first pixel electrode 216A and the second pixel electrode 216B of the LC capacitor 216 are also substantially mirrored to each other. Further, the pixel 210 corresponds to one first data line 220, one second data line 230, one first scan line 240, one second scan line 250, one first common line 260 and one second common line 270. The first transistor 212 has a first source 212A electrically connected to the corresponding first data line 220 to receive a corresponding first pixel voltage signal, a first drain 212B, and a first gate 212C electrically connected to the first scan line 240 to receive a corresponding first scan voltage signal. The first storage capacitor 214 has a first end 214A electrically connected to the first drain 212B of the first transistor 212, and a second end 214B electrically connected to the first common line 260. The second transistor 218 has a second source 218A electrically connected to the corresponding second data line 230 to receive a corresponding second pixel voltage signal, a second drain 218B, and a second gate 218C electrically connected to the second scan line 250 to receive a corresponding second scan voltage signal. The second storage capacitor 219 has a first end 219A electrically connected to the second drain 218B of the second transistor 218, and a second end 219B electrically connected to the second common line 270. The LC capacitor 216 has a first end 216A electrically connected to the first drain 212B of the first transistor 212, and a second end 216B electrically connected to the second drain 218B of the second transistor 218. Thus, when the first scan line 240 provides a corresponding first scan voltage signal to the first gate 212C to turn on the first transistor 212, the first transistor 212 may transmit the first pixel voltage signal from the first data line 220 to the first end 216A of the LC capacitor 216. Similarly, when the second scan line 250 provides a corresponding second scan voltage signal to the second gate 218C to turn on the second transistor 218, the second transistor 218 may transmit the second pixel voltage signal from the second data line 230 to the second end 216B of the LC capacitor 216. As discussed above, for each of the pixels 210, the first scan voltage signal and the second scan voltage signal being provided to the same pixel 210 can be identical. Thus, the first transistor 212 and the second transistor 218 will be simultaneously turned on or turn off, such that the first pixel voltage signal and the second pixel voltage signal will be respectively transmitted to the first end 216A and the second end 216B of the LC capacitor 216 simultaneously.

In certain embodiments, in the actual manufacturing process of the liquid crystal display panel having the pixel circuit structure 200, the first end 216A of the LC capacitor 216 may be formed as a first pixel electrode disposed on one substrate of the liquid crystal display panel, and the second end 216B of the LC capacitor 216 may be formed as a second pixel electrode disposed on the other opposite substrate of the liquid crystal display panel. In this case, the LC capacitor 216 functions as a pixel capacitor, where the first pixel electrode 216A (i.e., the first end 216A of the LC capacitor 216) is supplied with the first pixel voltage signal, and the second pixel electrode 216B (i.e., the second end 216B of the LC capacitor 216) is supplied with the second pixel voltage signal.

Figure 3:
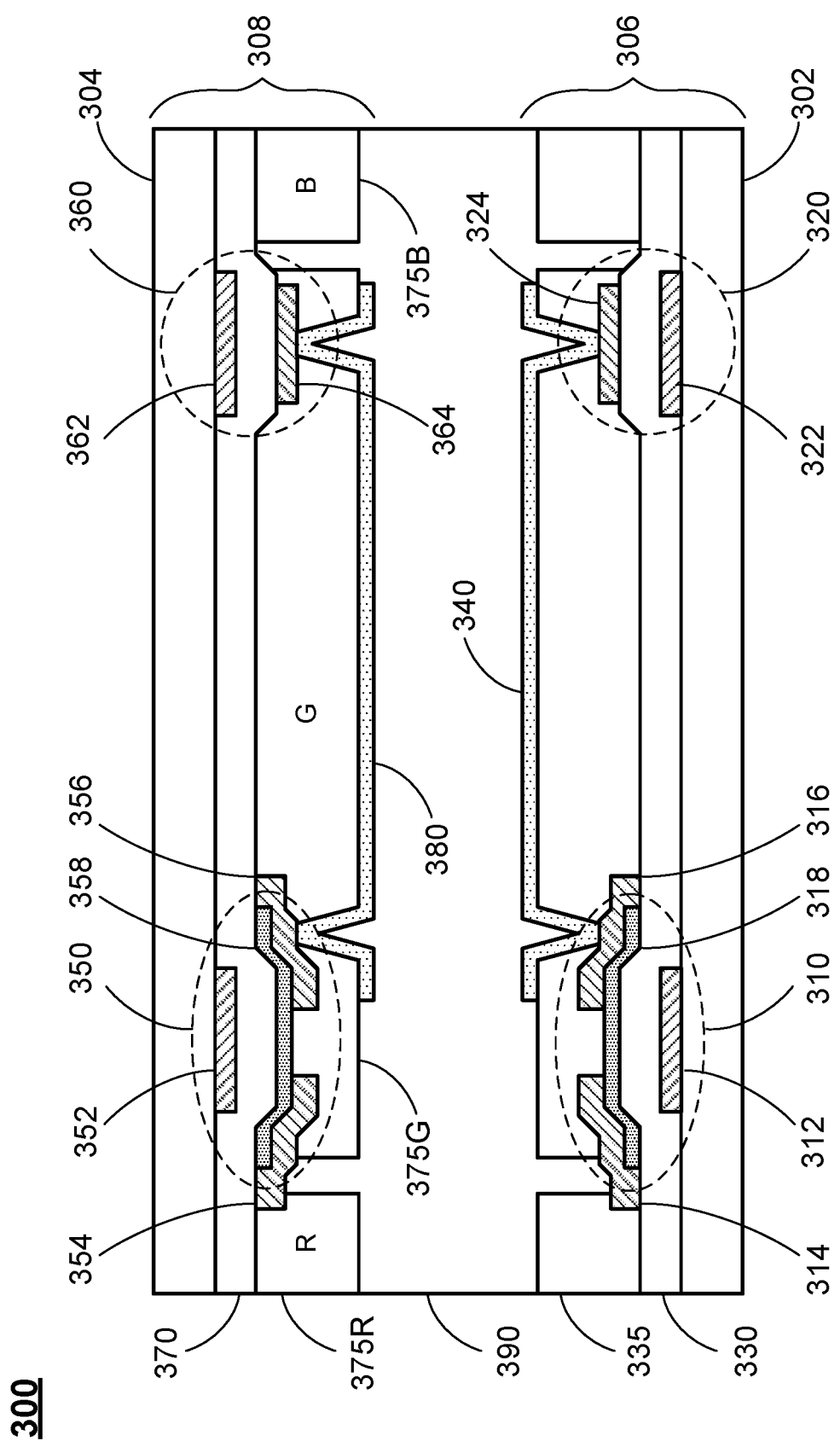
FIG. 3 shows a side cross-sectional schematic view of a liquid crystal display panel having the pixel circuit structure as shown in FIGS. 2A and 2B according to certain embodiments of the present disclosure.

FIG. 3 shows a side cross-sectional schematic view of a liquid crystal display panel having the pixel circuit structure as shown in FIGS. 2A and 2B according to certain embodiments of the present disclosure. Specifically, the liquid crystal display panel 300 as shown in FIG. 3 is a liquid crystal display panel in the TN mode or the VA mode. In other words, the liquid crystal display panel 300 may be a TN LCD panel or a VA LCD panel. Further, the liquid crystal display panel 300 as shown in FIG. 3 illustrates a pixel having the mirrored structures of the two sets of pixel circuit arrays respectively formed on two substrates to implement the pixel circuit structure 200 as shown in FIGS. 2A and 2B. It should be noted that some of the components of the pixel circuit structure are illustrated with the same pattern as shown in FIG. 3 to indicate that these components with the same pattern are formed in a same layer.

As shown in FIG. 3, the liquid crystal display panel 300 includes a first substrate 302 (which is a bottom substrate) and a second substrate 304 (which is a top substrate) spaced apart from each other, and a liquid crystal layer 390 disposed between the first substrate 302 and the second substrate 304. Further, multiple pixel circuit components are disposed on the first substrate 302, forming a bottom structure 306, and multiple pixel circuit are disposed on the second substrate 304, forming a top structure 308. The bottom structure 306 and the top structure 308 are mirrored structures, and the liquid crystal layer 390 is disposed between the bottom structure 306 and the top structure 308. Moreover, although FIG. 3 only shows one pixel, it should be understandable that the bottom structures 306 of multiple pixels may form a first pixel array, and the top structures 308 of multiple pixels may correspondingly form a second pixel array, which is a mirrored structure of the first pixel array.

The bottom structure 306 includes a first transistor 310, which corresponds to the first transistor 212 as shown in FIG. 2B; a first storage capacitor 320, which corresponds to the first storage capacitor 214 as shown in FIG. 2B; and a first pixel electrode 340, which corresponds to the first end 216A of the LC capacitor 216 as shown in FIG. 2B. Specifically, the first transistor 310 is formed by a first gate electrode 312 (corresponding to the first gate 212C as shown in FIG. 2B), a first dielectric layer 330, a first semiconductor layer 318, a first source electrode 314 (corresponding to the first source 212A as shown in FIG. 2B) and a first drain electrode 316 (corresponding to the first drain 212B as shown in FIG. 2B). The first storage capacitor 320 is formed by two electrodes 322 (corresponding to the second end 214B as shown in FIG. 2B) and 324 (corresponding to the first end 214A as shown in FIG. 2B) separated by the first dielectric layer 330. The first gate electrode 312 is electrically connected to a corresponding first scan line (not shown in FIG. 3), the first source electrode 314 is electrically connected to a corresponding first data line (not shown), and the electrode 322 is electrically connected to a corresponding first common line (not shown). In the manufacturing process, the first gate electrode 312 and the electrode 322 can be formed by one metal layer, and the first source electrode 314, the first drain electrode 316 and the electrode 324 can be formed by another metal layer. A transparent insulating layer 335 is formed on the first transistor 310 and the first storage capacitor 320, such that the first pixel electrode 340 (corresponding to the first end 216A of the LC capacitor 216 as shown in FIG. 2B) is electrically connected to the first drain electrode 316 and the electrode 324 respectively.

Similarly, as the mirrored structure of the bottom structure 306, the top structure 308 includes a second transistor 350, which corresponds to the second transistor 218 as shown in FIG. 2B; a second storage capacitor 360, which corresponds to the second storage capacitor 219 as shown in FIG. 2B; and a second pixel electrode 380, which corresponds to the second end 216B of the LC capacitor 216 as shown in FIG. 2B. Specifically, the second transistor 350 is formed by a second gate electrode 352 (corresponding to the second gate 218C as shown in FIG. 2B), a second dielectric layer 370, a second semiconductor layer 358, a second source electrode 354 (corresponding to the second source 218A as shown in FIG. 2B) and a second drain electrode 356 (corresponding to the second drain 218B as shown in FIG. 2B). The second storage capacitor 360 is formed by two electrodes 362 (corresponding to the second end 219B as shown in FIG. 2B) and 364 (corresponding to the first end 219A as shown in FIG. 2B) separated by the dielectric layer 330. The second gate electrode 352 is electrically connected to a corresponding second scan line (not shown in FIG. 3), the second source electrode 354 is electrically connected to a corresponding second data line (not shown), and the electrode 362 is electrically connected to a corresponding second common line (not shown). In the manufacturing process, the second gate electrode 352 and the electrode 362 can be formed by one metal layer, and the second source electrode 354, the second drain electrode 356 and the electrode 364 can be formed by another metal layer. A green (G) color filter layer 375G is formed on the second transistor 350 and the second storage capacitor 360, such that the pixel as shown in FIG. 3 is a green (G) pixel, and the second pixel electrode 380 (corresponding to the second end 216B of the LC capacitor 216 as shown in FIG. 2B) is electrically connected to the second drain electrode 356 and the electrode 364 respectively. Moreover, two color filter layers 375R and 375B are partially illustrated at the two sides of the green (G) color filter layer 375G to correspond to the adjacent red (R) pixel and the adjacent blue (B) pixel.

Taken the liquid crystal display panel 300 as a whole, the first pixel electrode 340 of the bottom structure 306 and the second pixel electrode 380 of the top structure 308 are located opposite to each other, thus correspondingly forming a pixel capacitor, which corresponds to the LC capacitor 216 as shown in FIG. 2B. Thus, the pixel circuit structure of the liquid crystal display panel 300 as shown in FIG. 3 corresponds to the pixel circuit structure 200 as shown in FIGS. 2A and 2B.

As shown in FIG. 3, the components of the bottom structure 306 and the top structure 308 are mirrored structures. Specifically, the only components that are not correspondingly identical in the bottom structure 306 and the top structure 308 are the transparent insulating layer 335, which is generally formed as a transparent polymer layer, and the color filter layers 375R, 375G and 375B. In certain embodiments, in the actual manufacturing process of the liquid crystal display panel 300, the bottom structure 306 and the top structure 308 may be manufactured using similar manufacturing processes, forming the same TFT array pattern on the two substrates 302 and 304, with the only different steps in the manufacturing processes corresponding to the forming of the transparent insulating layer 335 and the color filter layers 375R, 375G and 375B. For example, in certain embodiments, the top structure 308 may be formed using the color-on-array (COA) technology, such that the second pixel array formed by the top structures 308 of the pixels is a COA TFT matrix. Once the bottom structure 306 and the top structure 308 are manufactured, one of the bottom structure 306 and the top structure 308 can be flipped over and align with the other, such that the first pixel electrode 340 of the bottom structure 306 and the second pixel electrode 380 of the top structure 308 match with each other.

Figure 4:
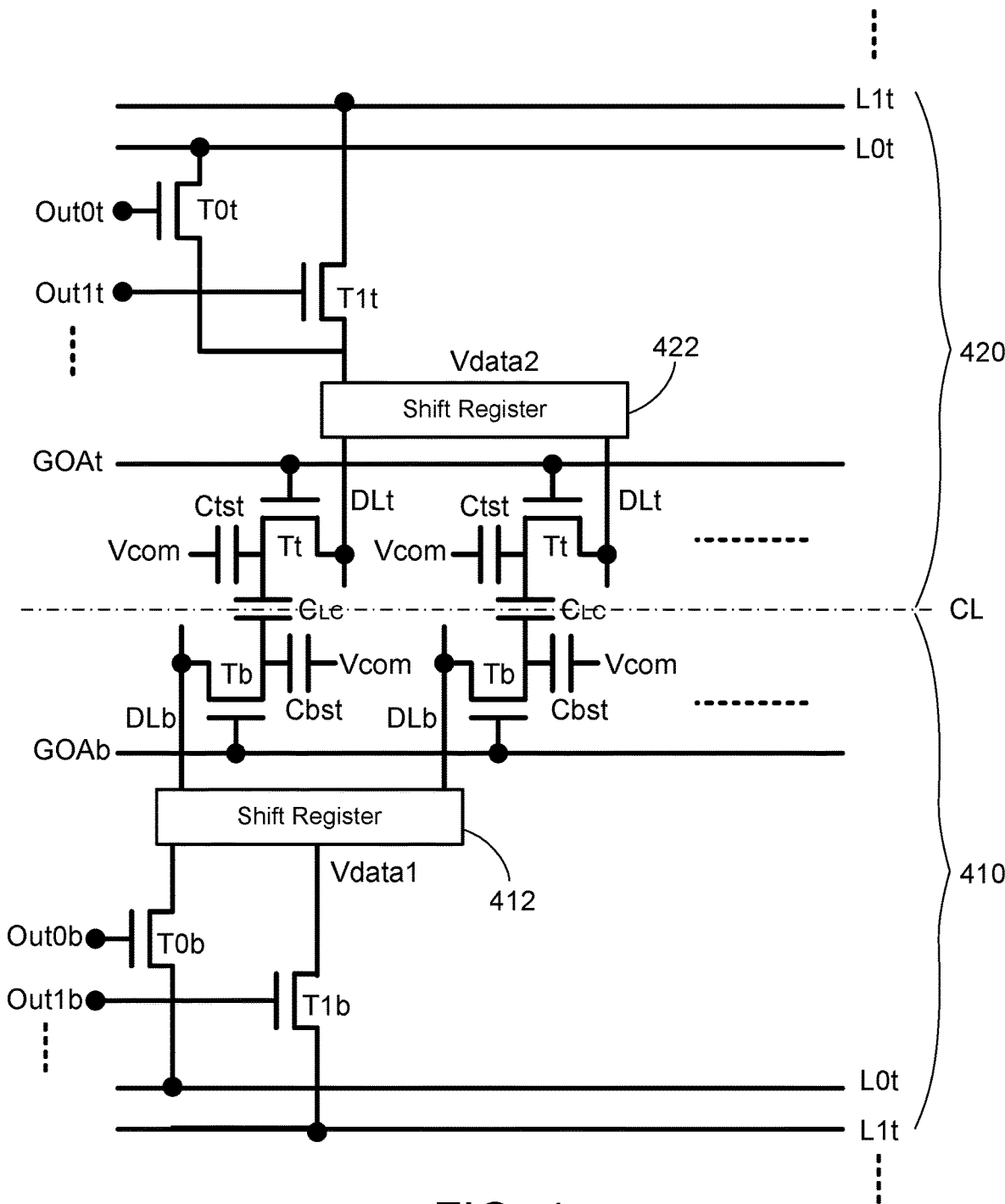
FIG. 4 shows a schematic view of a gate-on-array (GOA) pixel circuit structure as shown in FIGS. 2A and 2B according to certain embodiments of the present disclosure.

In certain embodiments, the pixel circuit structure 200 of the liquid crystal display panel as shown in FIGS. 2A and 2B may be implemented using a gate-on-array (GOA) configuration. For example, FIG. 4 shows a schematic view of a GOA pixel circuit structure as shown in FIGS. 2A and 2B according to certain embodiments of the present disclosure. Specifically, the pixel circuit structure 400 as shown in FIG. 4 includes a bottom structure 410 and a top structure 420 (separated by a virtual center line CL), which respectively correspond to the bottom structure 306 and the top structure 308 as shown in FIG. 3. For each of the pixels, the bottom structure 410 includes a first transistor Tb, a first storage capacitor Cbst, and a first end of the LC capacitor CLC. The first transistor Tb has a first gate electrically connected to a second gate line GOAb, a first source electrically connected to a first data line DLb, and a first drain. The first storage capacitor Cbst has a first end electrically connected to the first drain, and a second end electrically connected to the common electrode Vcom. The first end of the LC capacitor CLC is also electrically connected to the first drain. Further, the bottom structure 410 also includes a shift register 412, which is electrically connected to all of the first data lines DLb to provide the first data voltage signals to the first data lines DLb. Specifically, the shift register 412 is electrically connected to a plurality of analog voltage sources $L0b$, $L1b, \ldots, Lnb$ via a plurality of data input transistors $T0b$, $T1b, \ldots, Tnb$. Taking the analog voltage source $L0b$ as an example, the analog voltage source $L0b$ is configured to provide a corresponding first analog voltage signal with a specific analog voltage level to the shift register 412 via the corresponding data input transistor $T1b$. Thus, the shift register 412 may transmit the first analog voltage signals from the as the first pixel voltage signals Vdata1 to the corresponding pixels.

For each of the pixels, the top structure 420 includes a second transistor Tt, a second storage capacitor Ctst, and a second end of the LC capacitor CLC. The second transistor Tt has a second gate electrically connected to a second gate line GOAt, a second source electrically connected to a second data line DLt, and a second drain. The second storage capacitor Ctst has a first end electrically connected to the second drain, and a second end electrically connected to the common electrode Vcom. The second end of the LC capacitor CLC is also electrically connected to the first drain. Further, the top structure 420 also includes a shift register 422, which is electrically connected to all of the second data lines DLt to provide the second data voltage signals to the second data lines DLt. Specifically, the shift register 422 is electrically connected to a plurality of analog voltage sources $L0t$, $L1t, \ldots, Lnt$ via a plurality of data input transistors $T0t$, $T1t, \ldots, Tnt$. Taking the analog voltage source L0*t* as an example, the analog voltage source L0*t* is configured to provide a corresponding second analog voltage signal with a specific analog voltage level to the shift register 422 via the corresponding data input transistor T0*t*. Thus, the shift register 422 may transmit the first analog voltage signals from the as the second pixel voltage signals Vdata2 to the corresponding pixels.

With the pixel circuit structure 400 as shown in FIG. 4, the shift registers 412 and 422 allow two analog voltage signals with specific analog voltage levels to be respectively transmitted to the first end and the second end of the LC capacitor CLC of each of the pixels, thus achieving the gray scale LCD panel with multiplexed analog gray levels.

In comparison with the pixel circuit structure as shown in FIGS. 1A and 1B, the pixel circuit structure of the liquid crystal display panel as shown in each of FIGS. 2A, 2B, 3 and 4 may give an extra degree of freedom for supplying multiplexed analog gray levels to each pixel. Specifically, with the pixel circuit structure of the liquid crystal display panel as shown in FIGS. 2A, 2B, 3 and 4 having two separate pixel electrodes, to implement a 6-bit gray scale ($2^6$=64 gray levels), the two pixel electrodes no longer requires 64 analog voltage levels. Instead, using combinations of different voltages on the first and second pixel electrodes, each of the two pixel electrodes requires only 2*V64=16 analog voltage levels. Similarly, to implement an 8-bit gray scale ($2^8$=256 gray levels), each of the two pixel electrodes requires only 2*V256=32 analog voltage levels, instead of 256 analog voltage levels.

Figure 5A:
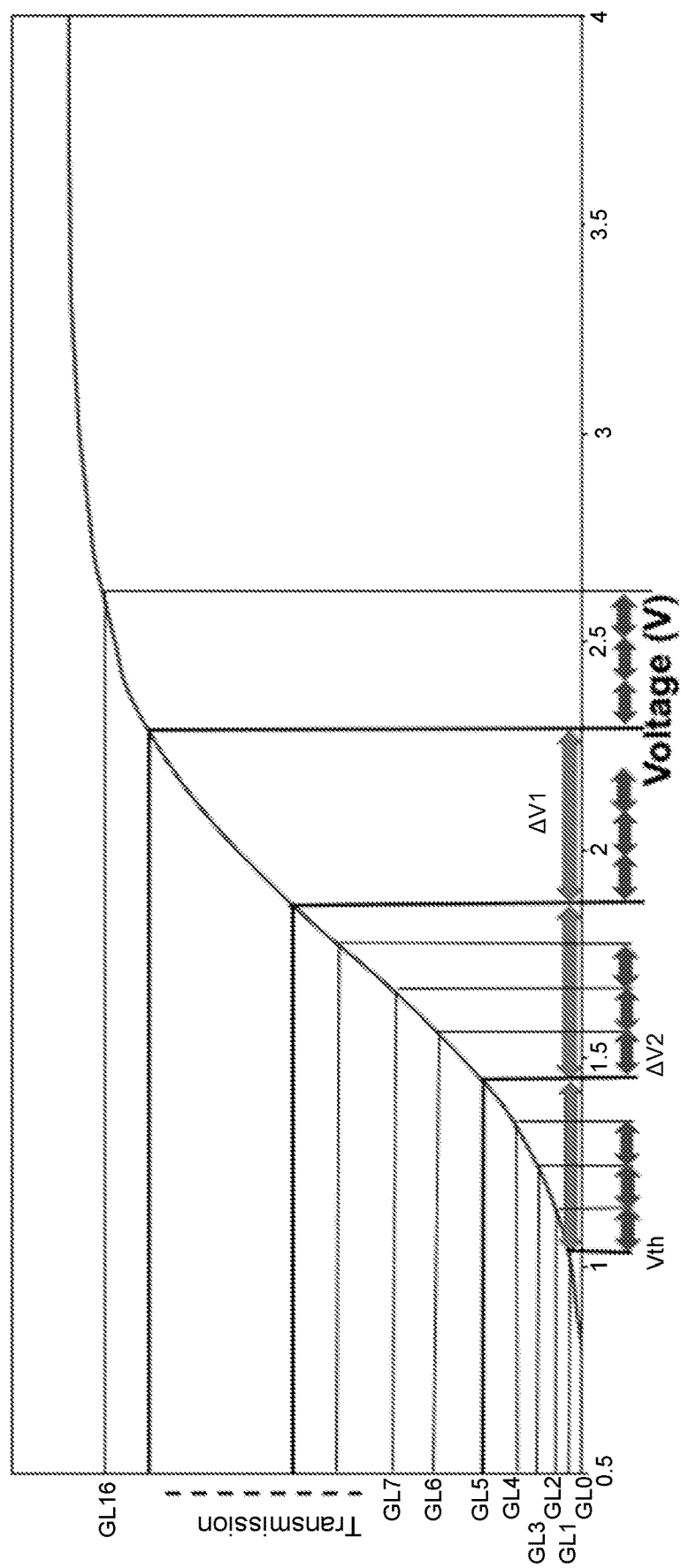
FIG. 5A shows a chart of the transmission-to-voltage curve of for a black-and-white liquid crystal display panel having the pixel circuit structure as shown in FIGS. 2A and 2B according to certain embodiments of the present disclosure, with a 4 bit gray scale with 16 gray levels.

FIG. 5A shows a chart of the transmission-to-voltage curve of for a black-and-white liquid crystal display panel having the pixel circuit structure as shown in FIGS. 2A and 2B according to certain embodiments of the present disclosure, with a 4 bit gray scale with 16 gray levels. Specifically, as shown in FIG. 5A, to achieve the 4 bit gray scale with 16 gray levels, the first pixel electrode on the bottom substrate of each pixel can receive V16=4 course data voltages in equal steps of a first voltage difference ΔV1, starting with a threshold voltage Vth, resulting in the 4 analog voltage levels of Vth, Vth+ΔV1, Vth+2*ΔV1, and Vth+3*ΔV1. In other words, the first pixel voltage signal being provided to the first pixel electrode is switchable between 0, Vth, Vth+ΔV1, Vth+2*ΔV1, and Vth+3*ΔV1. Similarly, the second pixel electrode on the top substrate can receive 4 fine data voltages in equal steps of a second voltage difference ΔV2, starting with 0 V, resulting in the 4 analog voltage levels of 0 V, −ΔV2, −2*ΔV2 and −3*ΔV2. In other words, the second pixel voltage signal being provided to the second pixel electrode is switchable between 0, −ΔV2, −2*ΔV2, and −3*ΔV2. As shown in FIG. 5A, ΔV2=ΔV1/4. In certain embodiments, ΔV2 may be a voltage difference different from ΔV1.

In practice, for each of the pixels, the corresponding first data line supplies the first pixel voltage signal (with the course voltage levels Vdata1) to the first pixel electrode, and the corresponding second data line supplies the second pixel voltage signal (with the fine voltage levels Vdata2) to the second pixel electrode. Thus, the LC pixel voltage at the LC capacitor is the difference between Vdata1 on the first pixel electrode and Vdata2 on the second pixel electrode, i.e., Vdata1−Vdata2, which may cover most of the transmission voltage curve of the LC mode.

FIG. 5B shows a table of gray levels for all combinations of the LC pixel voltages based on the curve as shown in FIG. 5A. Specifically, in certain embodiments, as shown in the table of FIG. 5B, the LC capacitor needs to be driven alternatingly with the positive voltages VLCodd and negative voltages VLCeven of the same absolute magnitude to avoid flicker and LC degradation. To achieve this, the polarity of the pixel voltage can be changed from frame to frame by applying the course data voltages (Vth, Vth+ΔV1, Vth+2*ΔV1, and Vth+3*ΔV1) to the first pixel electrodes via the first data line in odd frames, and to the second pixel electrodes via the second data line in even frames, respectively. The fine data voltages (0 V, −ΔV2, −2*ΔV2 and −3*ΔV2) will then be applied to the second pixel electrodes via the second data line in the odd frames, and to the first pixel electrodes via the first data line in the even frames, respectively. Line inversion and dot inversion can be obtained in the usual way. It should be particularly noted that, in addition to the 16 LC pixel voltage levels of Vdata1−Vdata2, one more dark level GL0 with Vlc=0 is also obtainable by supplying the first fine data voltage (0 V) to data line 1 as well.

The data as shown in FIGS. 5A and 5B are obtained with a 4 bit gray scale with 16 gray levels. In certain embodiments, when a quantity of gray levels displayed by each of the pixels of the LCD panel is M, and the first pixel electrode and the second pixel electrode in each of the pixels are provided with a voltage switchable between N analog levels, a formula may be obtained as:

$$N=2\times\sqrt{M} \quad (1)$$

where M and N are integers. It should be noted that the quantity M represents of a quantity of analog input levels required in a conventional LCD panel such as the LCD panel with the pixel circuit structure 100 as shown in FIGS. 1A and 1B, and the quantity N represents a quantity of the analog input levels required in the LCD panel according to certain embodiments of the present disclosure, such as the LCD panel with the pixel circuit structure as shown in FIGS. 2A, 2B, 3 and 4. In certain embodiments, when M=$2^{2X}$, N=$2^{X+1}$ where X is an integer. For example, for a 4-bit gray scale, M=16, N=8, and X=2. For a 6-bit gray scale, M=64, N=16, and X=3. FIG. 5C shows a table of the quantity of gray levels displayed by each of the pixels of the LCD panel gray scales related to the quantity of analog level in which the voltage is switchable according to certain embodiments of the present disclosure, including the data of 3-bit to 8-bit gray scales.

In certain embodiments, other combinations between the first and second data voltages, including mixing fine and course data voltages on the first and second pixel electrodes with either positive or negative polarity, are also possible depending on the transmission-voltage curve of the LC mode and the required contrast ratio. For each of the pixels, the incoming digital data signal has to be processed in an image processing chip to obtain the correct combinations of voltage levels on the first data line for the first pixel electrode and the second data line for the second pixel electrode.

In the embodiments as discussed above, the pixel circuit structure of a liquid crystal display panel in the TN mode or the VA mode was discussed. For a liquid crystal display panel in an in-plane switching (IPS) mode or a fringe field switching (FFS) mode, the pixel circuit structure may be easier to implement, since both pixel electrodes may be disposed on a same substrate.

Figure 6A:
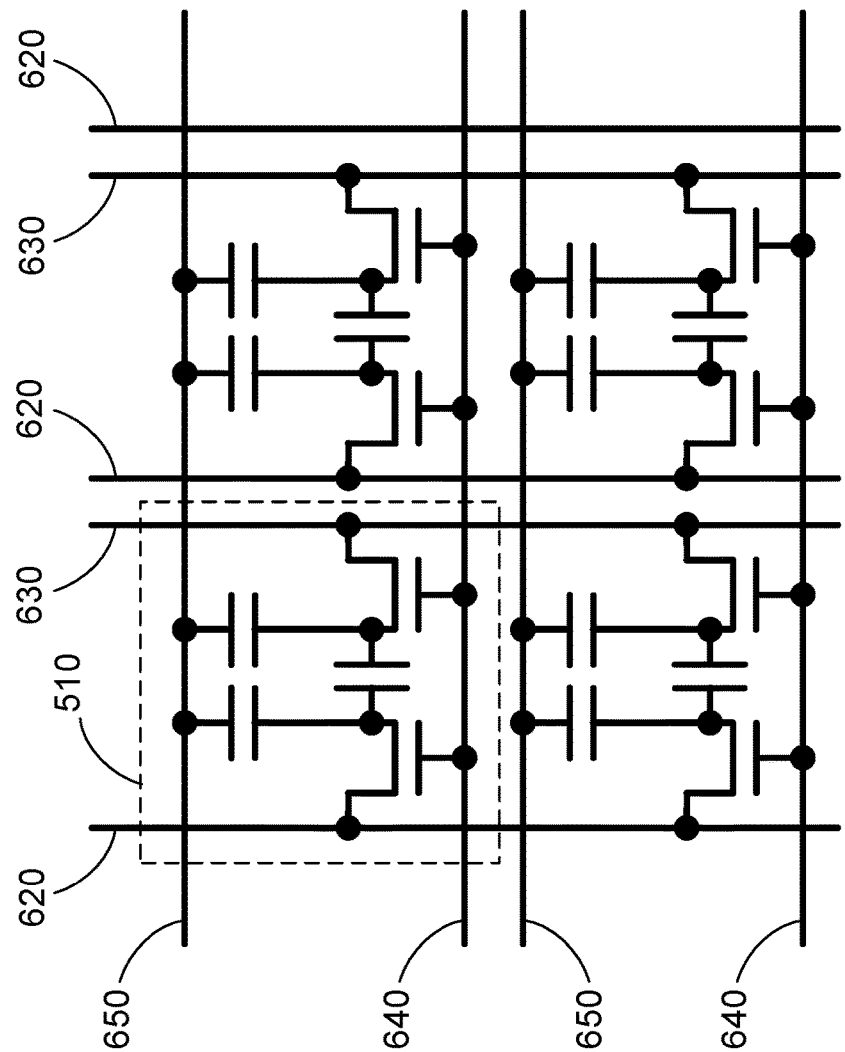
FIG. 6A shows a top schematic view of a pixel circuit structure of a liquid crystal display panel according to certain embodiments of the present disclosure.
Figure 6B:
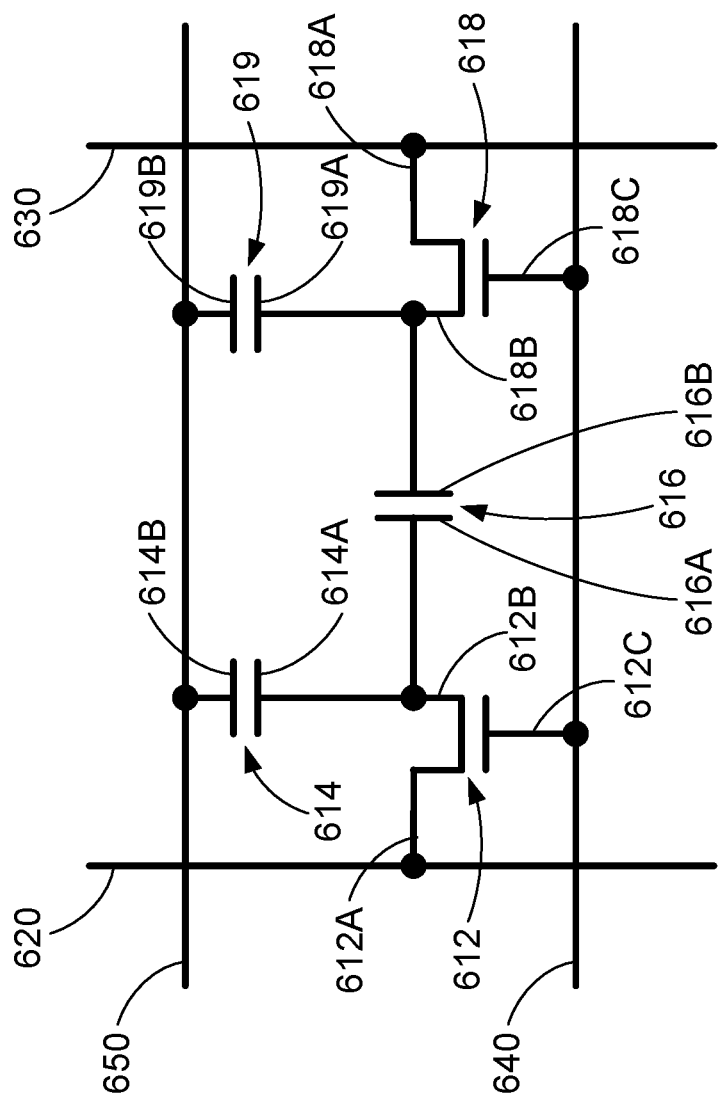
FIG. 6B shows an enlarged view of the pixel circuit structure of one pixel as shown in FIG. 6A.

FIG. 6A shows a top schematic view of a pixel circuit structure of a liquid crystal display panel of a display device according to certain embodiments of the present disclosure, and FIG. 6B shows an enlarged view of the pixel circuit structure of one pixel as shown in FIG. 6A. Specifically, the pixel circuit structure 600 as shown in FIGS. 6A and 6B is applicable to a liquid crystal display panel in the IPS mode or the FFS mode. Further, although not explicitly shown in the pixel circuit structure 600, the liquid crystal display panel may include two substrates which are spaced apart from each other, and a liquid crystal layer may be disposed between the two substrates. In this case, the components of the pixel circuit structure 600 are all formed on one of the two substrates to form a pixel array thereon, and the liquid crystal layer may be disposed between the pixel array and the other substrate on which no pixel array is formed. Thus, the components of the pixel circuit structure 600 are all illustrated in solid lines to indicate that the components are all formed on the same one of the two substrates.

As shown in FIG. 6A, the pixel circuit structure 600 includes a pixel array defining a pixel matrix having a plurality of pixels 610. In addition, the pixel circuit structure 600 further includes a plurality of first data lines 620 and a plurality of second data lines 630 extending along the vertical direction, a plurality of scan lines 640 extending along the horizontal direction, and a plurality of common lines 650 extending along the horizontal direction. The first data lines 620 are used to provide first pixel voltage signals to the pixels 610, and the second data lines 630 are used to provide second pixel voltage signals to the pixels 610. The scan lines 640 are used to provide scan voltage signals to the pixels 610. The common lines 650 are used to provide a common voltage signal to the pixels 610. It should be particularly noted that, since all components of the pixel circuit structure 600 are disposed on the same substrate, there is only one scan line 640 and only one common line 650 required for each of the pixels 610.

As shown in FIG. 6B, for each of the pixels 610, the pixel circuit of the pixel 610 has a substantially mirrored structure, including a first transistor 612, a first storage capacitor 614, a LC capacitor 616, a second transistor 618 and a second storage capacitor 619. The first transistor 612 and the second transistor 618 are substantially mirrored to each other, the first storage capacitor 614 and the second storage capacitor 619 are substantially mirrored to each other, and the first pixel electrode 616A and the second pixel electrode 616B of the LC capacitor 616 are also substantially mirrored to each other. Further, the pixel 610 corresponds to one first data line 620, one second data line 630, one scan line 640 and one common line 650. The first transistor 612 has a first source 612A electrically connected to the corresponding first data line 620 to receive a corresponding first pixel voltage signal, a first drain 612B, and a first gate 612C electrically connected to the scan line 640 to receive a corresponding scan voltage signal. The first storage capacitor 614 has a first end 614A electrically connected to the first drain 612B of the first transistor 612, and a second end 614B electrically connected to the common line 650. The second transistor 618 has a second source 618A electrically connected to the corresponding second data line 630 to receive a corresponding second pixel voltage signal, a second drain 618B, and a second gate 618C electrically connected to the scan line 640 to receive the corresponding scan voltage signal. The second storage capacitor 619 has a first end 619A electrically connected to the second drain 618B of the second transistor 618, and a second end 619B electrically connected to the common line 650. The LC capacitor 616 has a first end 616A (i.e., a first pixel electrode) electrically connected to the first drain 612B of the first transistor 612, and a second end 616B (i.e., a second pixel electrode) electrically connected to the second drain 618B of the second transistor 618. When the scan line 640 provides a corresponding scan voltage signal to the first gate 612C and the second gate 618C to turn on both the first transistor 612 and the second transistor 618, the first transistor 612 may transmit the first pixel voltage signal from the first data line 620 to the first end 616A of the LC capacitor 616, and the second transistor 618 may transmit the second pixel voltage signal from the second data line 630 to the second end 616B of the LC capacitor 616. Thus, the first transistor 612 and the second transistor 618 will be simultaneously turned on or turn off, such that the first pixel voltage signal and the second pixel voltage signal will be respectively transmitted to the first end 616A and the second end 616B of the LC capacitor 616 simultaneously.

Figure 7:
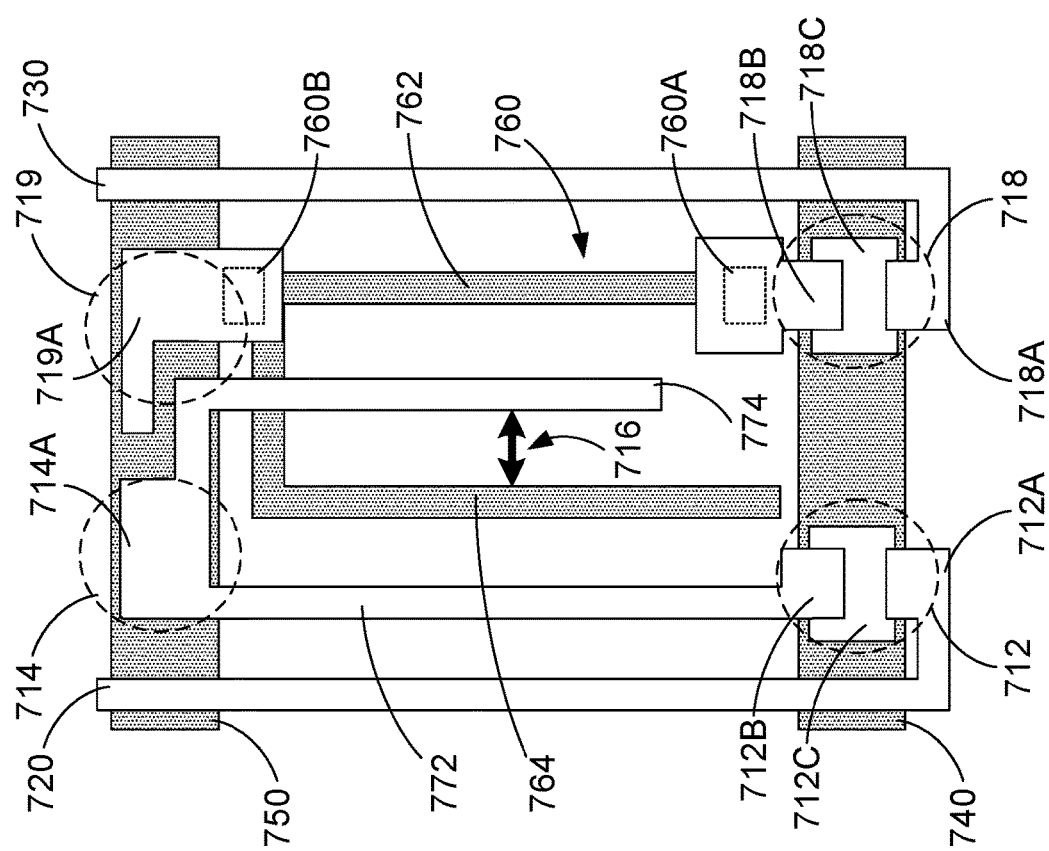
FIG. 7 shows a top schematic view of a pixel layout in the pixel circuit structure of an IPS liquid crystal display panel as shown in FIGS. 6A and 6B according to certain embodiments of the present disclosure.

FIG. 7 shows a top schematic view of a pixel layout in the pixel circuit structure of an IPS liquid crystal display panel as shown in FIGS. 6A and 6B according to certain embodiments of the present disclosure. Specifically, the pixel circuit structure 700 as shown in FIG. 7 is applicable to an IPS LCD panel. Further, the pixel circuit structure 700 as shown in FIG. 7 illustrates a pixel having the substantially mirrored structures of the pixel circuit formed on the same substrate to implement the pixel circuit structure 600 as shown in FIGS. 6A and 6B. It should be noted that some of the components of the pixel circuit structure are illustrated with the same pattern as shown in FIG. 7 to indicate that these components with the same pattern are formed in a same layer at substantially the same height.

As shown in FIG. 7, in the pixel layout 700, the pixel corresponds to a first data line 720, a second data line 730, a scan line 740 and a common line 750. Further, the pixel includes a first transistor 712, a first storage capacitor 714, a LC capacitor 716, a second transistor 718 and a second storage capacitor 719. The first transistor 712 has a first source 712A electrically connected to the corresponding first data line 720, a first drain 712B, and a first gate 712C electrically connected to the scan line 740. The first storage capacitor 714 has a first end 714A electrically connected to the first drain 712B of the first transistor 712 through a first branch 772, and a second end (not shown) electrically connected to the common line 750. Further, a second branch 774 extends from the first end 714A of the first storage capacitor 714. The second transistor 718 has a second source 718A electrically connected to the corresponding second data line 730, a second drain 718B, and a second gate 718C electrically connected to the scan line 740. A first via 760A is provided on the second drain 718B to electrically connect the second drain 718B to a connecting line 760. The second storage capacitor 719 has a first end 719A and a second end (not shown) electrically connected to the common line 6750. A second via 760B is provided on the first end 719A to electrically connect the first end 719A to the connecting line 760, such that the first end 719A is electrically connected to the second drain 718B of the second transistor 718 via the connecting line 760. The connecting line 760 has a third branch 762 and a fourth branch 764. In this case, the branches 772, 764, 774 and 762 are arranged to be substantially at intervals in a lateral direction. In other words, the lateral distance between the first branch 772 and the fourth branch 764, the lateral distance between the fourth branch 764 and the second branch 774, and the lateral distance between the second branch 774 and the third branch 762 are all the same. The LC capacitor 716 is formed between the branches 772, 764, 774 and 762, where the first branch 772 and the second branch 774 function as a first end 716A (i.e., the first pixel electrode) electrically connected to the first drain 712B of the first transistor 712, and the third branch 762 and the fourth branch 764 of the connecting line 760 function as a second end 716B (i.e., the second pixel electrode) electrically connected to the second drain 718B of the second transistor 718 via the connecting line 760.

In certain embodiments, it is also possible to further simplify the pixel circuit structure 600 as shown in FIGS. 6A and 6B, such that only one storage capacitor is required, and no common line is needed. In this case, the storage capacitor is disposed to be parallel to the LC capacitor. Since no common line is needed, the pixel aperture ratio of the liquid crystal display panel can be increased.

Figure 8A:
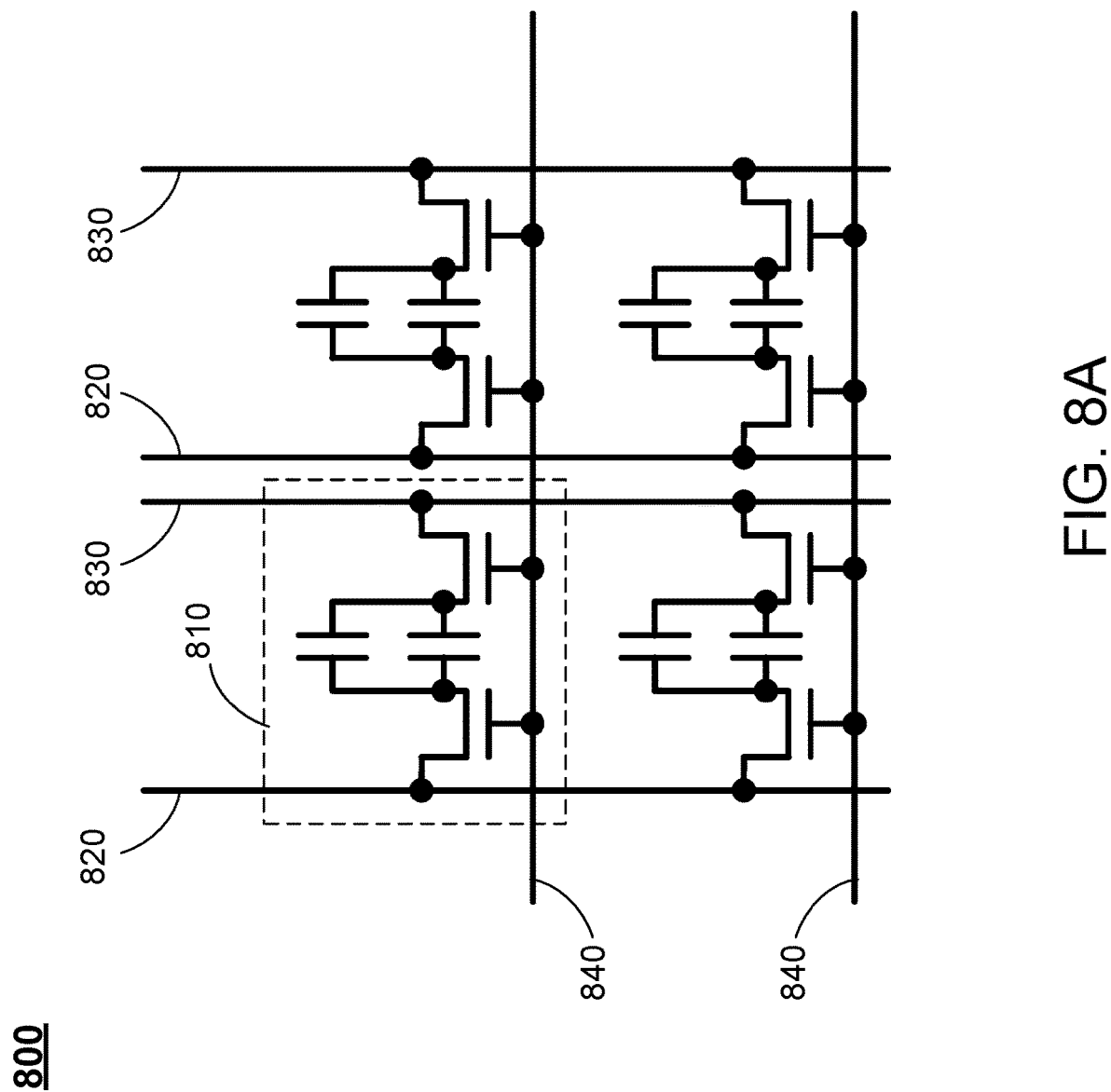
FIG. 8A shows a top schematic view of a pixel circuit structure of a liquid crystal display panel according to certain embodiments of the present disclosure.
Figure 8B:
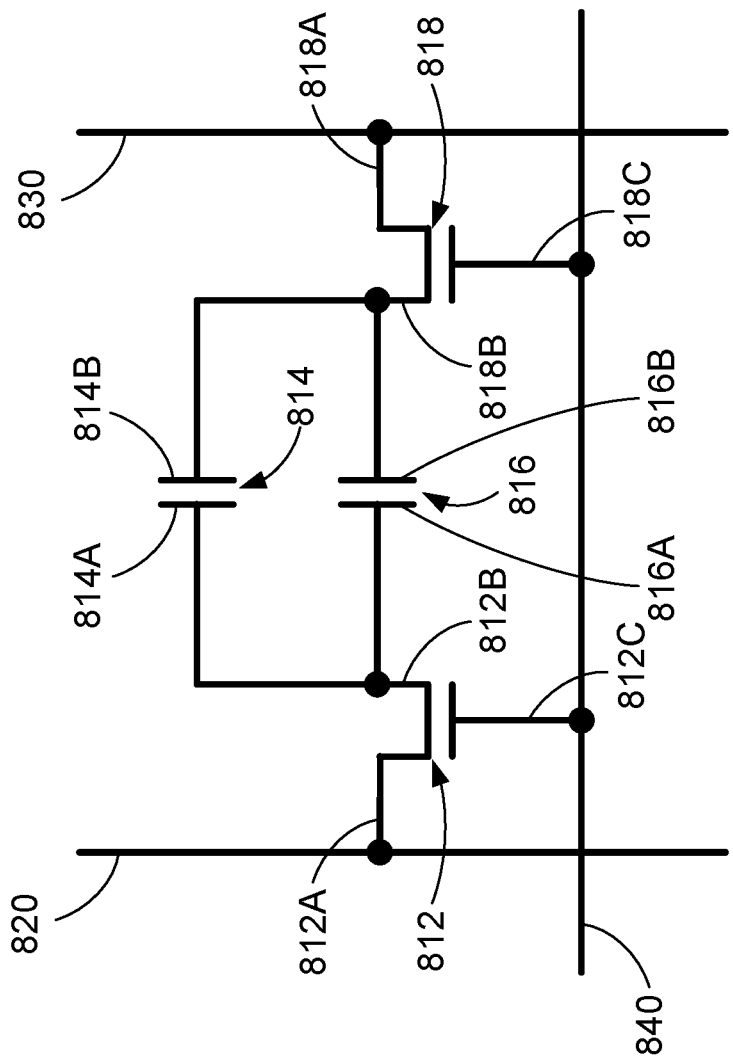
FIG. 8B shows an enlarged view of the pixel circuit structure of one pixel as shown in FIG. 8A.

FIG. 8A shows a top schematic view of a pixel circuit structure of a liquid crystal display panel according to certain embodiments of the present disclosure, and FIG. 8B shows an enlarged view of the pixel circuit structure of one pixel as shown in FIG. 8A. Specifically, the pixel circuit structure 800 as shown in FIGS. 8A and 8B is also applicable to a liquid crystal display panel in the IPS mode or the FFS mode. Further, although not explicitly shown in the pixel circuit structure 800, the liquid crystal display panel may include two substrates which are spaced apart from each other, and a liquid crystal layer may be disposed between the two substrates. In this case, the components of the pixel circuit structure 800 are all formed on one of the two substrates to form a pixel array thereon, and the liquid crystal layer may be disposed between the pixel array and the other substrate on which no pixel array is formed. Thus, the components of the pixel circuit structure 800 are all illustrated in solid lines to indicate that the components are all formed on the same one of the two substrates.

As shown in FIG. 8A, the pixel circuit structure 800 includes a pixel array defining a pixel matrix having a plurality of pixels 810. In addition, the pixel circuit structure 800 further includes a plurality of first data lines 820 and a plurality of second data lines 830 extending along the vertical direction, and a plurality of scan lines 840 extending along the horizontal direction. No common line is provided in the pixel circuit structure 800. The first data lines 820 are used to provide first pixel voltage signals to the pixels 810, and the second data lines 830 are used to provide second pixel voltage signals to the pixels 810. The scan lines 840 are used to provide scan voltage signals to the pixels 810. It should be particularly noted that, since all components of the pixel circuit structure 800 are disposed on the same substrate, there is only one scan line 840 required for each of the pixels 810.

As shown in FIG. 8B, for each of the pixels 810, the pixel circuit of the pixel 810 has a substantially mirrored structure, including a first transistor 812, a storage capacitor 814, a LC capacitor 816, and a second transistor 818. The first transistor 812 and the second transistor 818 are substantially mirrored to each other. The storage capacitor 814 and the LC capacitor 816 are disposed in parallel to each other. Further, the pixel 810 corresponds to one first data line 820, one second data line 830, and one scan line 840. The first transistor 812 has a first source 812A electrically connected to the corresponding first data line 820 to receive a corresponding first pixel voltage signal, a first drain 812B, and a first gate 812C electrically connected to the scan line 840 to receive a corresponding scan voltage signal. The second transistor 818 has a second source 818A electrically connected to the corresponding second data line 830 to receive a corresponding second pixel voltage signal, a second drain 818B, and a second gate 818C electrically connected to the scan line 840 to receive the corresponding scan voltage signal. The storage capacitor 814 has a first end 814A electrically connected to the first drain 812B of the first transistor 812, and a second end 814B electrically connected to the second drain 818B of the second transistor 818. The LC capacitor 816 has a first end 816A (i.e., a first pixel electrode) electrically connected to the first drain 812B of the first transistor 812, and a second end 816B (i.e., a second pixel electrode) electrically connected to the second drain 818B of the second transistor 818. When the scan line 840 provides a corresponding scan voltage signal to the first gate 812C and the second gate 818C to turn on both the first transistor 812 and the second transistor 818, the first transistor 812 may transmit the first pixel voltage signal from the first data line 820 to the first end 816A of the LC capacitor 816, and the second transistor 818 may transmit the second pixel voltage signal from the second data line 830 to the second end 816B of the LC capacitor 816. Thus, the first transistor 812 and the second transistor 818 will be simultaneously turned on or turn off, such that the first pixel voltage signal and the second pixel voltage signal will be respectively transmitted to the first end 816A and the second end 816B of the LC capacitor 816 simultaneously.

FIG. 9 shows a top schematic view of a pixel layout in the pixel circuit structure of an IPS liquid crystal display panel as shown in FIGS. 8A and 8B according to certain embodiments of the present disclosure. Specifically, the pixel circuit structure 900 as shown in FIG. 9 is applicable to an IPS LCD panel. Further, the pixel circuit structure 900 as shown in FIG. 9 illustrates a pixel having the substantially mirrored structures of the pixel circuit formed on the same substrate to implement the pixel circuit structure 800 as shown in FIGS. 8A and 8B. It should be noted that some of the components of the pixel circuit structure are illustrated with the same pattern as shown in FIG. 9 to indicate that these components with the same pattern are formed in a same layer at substantially the same height.

As shown in FIG. 9, in the pixel circuit structure 800, the pixel corresponds to a first data line 920, a second data line 930 and a scan line 940. Further, the pixel includes a first transistor 912, a storage capacitor 914, a LC capacitor 916 and a second transistor 918. The first transistor 912 has a first source 912A electrically connected to the corresponding first data line 920, a first drain 912B, and a first gate 912C electrically connected to the scan line 940. The second transistor 918 has a second source 918A electrically connected to the corresponding second data line 930, a second drain 918B, and a second gate 918C electrically connected to the scan line 840. A via 960A is provided on the second drain 918B to electrically connect the second drain 918B to a connecting line 960. The storage capacitor 914 has a first end 914A electrically connected to the first drain 912B of the first transistor 912 through a first branch 972, and a second end (not shown, located below the first end 914A) electrically connected to the connecting line 960, such that the second end of the storage capacitor 914 is electrically connected to the second drain 918B of the second transistor 918 via the connecting line 960. Further, a second branch 974 extends from the first end 914A of the storage capacitor 914. The connecting line 960 has a third branch 962 and a fourth branch 964. In this case, the branches 972, 964, 974 and 962 are arranged to be substantially at intervals in a lateral direction. In other words, the lateral distance between the first branch 972 and the fourth branch 964, the lateral distance between the fourth branch 964 and the second branch 974, and the lateral distance between the second branch 974 and the third branch 962 are all the same. The LC capacitor 916 is formed between the branches 972, 964, 974 and 962, where the first branch 972 and the second branch 974 function as a first end 916A (i.e., the first pixel electrode) electrically connected to the first drain 912B of the first transistor 912, and the third branch 962 and the fourth branch 964 of the connecting line 960 function as a second end 916B (i.e., the second pixel electrode) electrically connected to the second drain 918B of the second transistor 918 via the connecting line 960.

In the embodiments as shown in FIGS. 6A, 6B, 7, 8A, 8B and 9, although the pixel circuit structures are structurally different from the pixel circuit structures as shown in FIGS. 2A, 2B, 3 and 4, the implementation of the gray scale are similar. In other words, the data as shown in FIGS. 5A, 5B and 5C may also be applicable to the pixel circuit structures as shown in FIGS. 6A, 6B, 7, 8A, 8B and 9.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD) panel, comprising:
    a first substrate and a second substrate spaced apart from each other;
    a pixel array, disposed on the first substrate and defining a pixel matrix having a plurality of pixels, wherein for each of the pixels, the pixel array has a mirrored pixel circuit structure comprising a first pixel electrode and a second pixel electrode opposite to each other, and the first pixel electrode and the second pixel electrode in each of the pixels are independently controlled; and
    a liquid crystal layer disposed between the pixel array and the second substrate;
    wherein a quantity of gray levels displayed by each of the pixels of the LCD panel is M, the first pixel electrode and the second pixel electrode in each of the pixels are provided with a voltage switchable between N analog levels, M and N are integers, and $N=2\times\sqrt{M}$.

2. The LCD panel of claim 1, being an in-plane switching (IPS) LCD panel or a fringe field switching (FFS) LCD panel.

3. The LCD panel of claim 1, wherein the pixel array comprises:
    a plurality of first data lines extending along a first direction, configured to provide a plurality of first pixel voltage signals to the pixels;
    a plurality of second data lines extending along the first direction, configured to provide a plurality of second pixel voltage signals to the pixels;
    a plurality of common lines extending along a second direction, configured to provide a common voltage signal to the pixels;
    a plurality of scan lines extending along the second direction, configured to provide a plurality of scan voltage signals to the pixels; and
    a plurality of pixel circuits corresponding to the pixels, wherein each of the pixel circuits comprises:
        the first pixel electrode and the second pixel electrode opposite to each other;
        a first transistor having a first gate, a first source and a first drain, wherein the first source is electrically connected to one of the first data lines to receive one of the first pixel voltage signals, the first drain is electrically connected to the first pixel electrode, and the first gate is electrically connected to one of the scan lines to receive one of the scan voltage signals;
        a second transistor having a second gate, a second source and a second drain, wherein the second source is electrically connected to one of the second data lines to receive one of the second pixel voltage signals, the second drain is electrically connected to the second pixel electrode, and the second gate is electrically connected to the one of the scan lines to receive the one of the scan voltage signals;
        a first storage capacitor having a first end and a second end, wherein the first end is electrically connected to the first drain of the first transistor, and the second end is electrically connected to one of the common lines to receive the common voltage signal; and
        a second storage capacitor having a third end and a fourth end, wherein the third end is electrically connected to the second drain of the second transistor, and the fourth end is electrically connected to the one of the common lines to receive the common voltage signal.

4. The LCD panel of claim 1, wherein the pixel array comprises:
    a plurality of first data lines extending along a first direction, configured to provide a plurality of first pixel voltage signals to the pixels;
    a plurality of second data lines extending along the first direction, configured to provide a plurality of second pixel voltage signals to the pixels;
    a plurality of scan lines extending along a second direction, configured to provide a plurality of scan voltage signals to the pixels; and
    a plurality of pixel circuits corresponding to the pixels, wherein each of the pixel circuits comprises:
        the first pixel electrode and the second pixel electrode opposite to each other;
        a first transistor having a first gate, a first source and a first drain, wherein the first source is electrically connected to one of the first data lines to receive one of the first pixel voltage signals, the first drain is electrically connected to the first pixel electrode, and the first gate is electrically connected to one of the scan lines to receive one of the scan voltage signals;
        a second transistor having a second gate, a second source and a second drain, wherein the second source is electrically connected to one of the second data lines to receive one of the second pixel voltage signals, the second drain is electrically connected to the second pixel electrode, and the second gate is electrically connected to the one of the scan lines to receive the one of the scan voltage signals; and
        a storage capacitor having a first end and a second end, wherein the first end is electrically connected to the first drain of the first transistor, and the second end is electrically connected to the second drain of the second transistor.

5. The LCD panel of claim 1, further comprising a color filter layer, disposed on one of the first substrate and second substrate.

6. The LCD panel of claim 1, wherein $M=2^{2X}$, X is an integer, and $N=2^{X+1}$.

7. The LCD panel of claim 1, wherein M=16, and N=8.

8. The LCD panel of claim 7, wherein for each of the pixels,
the first pixel electrode is provided with a first pixel voltage signal switchable between 0, Vth, Vth+ΔV1, Vth+2*ΔV1, and Vth+3*ΔV1, wherein Vth is a threshold voltage, and ΔV1 is a first voltage difference; and
the second pixel electrode is provided with a second pixel voltage signal switchable between 0, −ΔV2, −2*ΔV2, and −3*ΔV2, wherein ΔV2 is a second voltage difference different from ΔV1.

9. The LCD panel of claim 8, wherein ΔV2=ΔV1/4.

10. A display device, comprising the LCD panel of claim 1.

11. A liquid crystal display (LCD) panel, comprising:
a first substrate and a second substrate spaced apart from each other;
a first pixel array, disposed on the first substrate;
a second pixel array, being a mirrored structure of the first pixel array and disposed on the second substrate, wherein the first pixel array and the second pixel array correspondingly define a pixel matrix having a plurality of pixels, and for each of the pixels, the first pixel array comprises a first pixel electrode, and the second pixel array comprises a second pixel electrode opposite to the first pixel electrode; and
a liquid crystal layer disposed between the first pixel array and the second pixel array;
wherein a quantity of gray levels displayed by each of the pixels of the LCD panel is M, the first pixel electrode and the second pixel electrode in each of the pixels are provided with a voltage switchable between N analog levels, M and N are integers, and $N=2\times\sqrt{M}$.

12. The LCD panel of claim 11, being a twisted nematic (TN) LCD panel or a vertical alignment (VA) LCD panel.

13. The LCD panel of claim 11, wherein the first pixel array comprises:
a plurality of first data lines extending along a first direction, configured to provide a plurality of first pixel voltage signals to the pixels;
a plurality of first common lines extending along a second direction, configured to provide a first common voltage signal to the pixels;
a plurality of first scan lines extending along the second direction, configured to provide a plurality of first scan voltage signals to the pixels; and
a plurality of first pixel circuits corresponding to the pixels, wherein each of the first pixel circuits comprises:
the first pixel electrode;
a first transistor having a first gate, a first source and a first drain, wherein the first source is electrically connected to one of the first data lines to receive one of the first pixel voltage signals, the first drain is electrically connected to the first pixel electrode, and the first gate is electrically connected to one of the first scan lines to receive one of the first scan voltage signals; and
a first storage capacitor having a first end and a second end, wherein the first end is electrically connected to the first drain of the first transistor, and the second end is electrically connected to one of the first common lines to receive the first common voltage signal.

14. The LCD panel of claim 13, wherein the second pixel array comprises:
a plurality of second data lines extending along the first direction, configured to provide a plurality of second pixel voltage signals to the pixels;
a plurality of second common lines extending along the second direction, configured to provide a second common voltage signal to the pixels;
a plurality of second scan lines extending along the second direction, configured to provide a plurality of second scan voltage signals to the pixels; and
a plurality of first pixel circuits corresponding to the pixels, wherein each of the first pixel circuits comprises:
the second pixel electrode;
a second transistor having a second gate, a second source and a second drain, wherein the second source is electrically connected to one of the second data lines to receive one of the second pixel voltage signals, the second drain is electrically connected to the second pixel electrode, and the second gate is electrically connected to one of second first scan lines to receive one of the first scan voltage signals; and
a second storage capacitor having a third end and a fourth end, wherein the third end is electrically connected to the second drain of the second transistor, and the fourth end is electrically connected to one of the second common lines to receive the second common voltage signal.

15. The LCD panel of claim 11, further comprising a color filter layer, disposed on one of the first substrate and second substrate.

16. The LCD panel of claim 11, wherein $M=2^{2X}$, X is an integer, and $N=2^{X+1}$.

17. The LCD panel of claim 11, wherein M=16, and N=8.

18. The LCD panel of claim 17, wherein for each of the pixels,
the first pixel electrode is provided with a first pixel voltage signal switchable between 0, Vth, Vth+ΔV1, Vth+2*ΔV1, and Vth+3*ΔV1, wherein Vth is a threshold voltage, and ΔV1 is a first voltage difference; and
the second pixel electrode is provided with a second pixel voltage signal switchable between 0, −ΔV2, −2*ΔV2, and −3*ΔV2, wherein ΔV2 is a second voltage difference different from ΔV1.

19. The LCD panel of claim 18, wherein ΔV2=ΔV1/4.

20. A display device, comprising the LCD panel of claim 11.

* * * * *